Feb. 26, 1929.

F. S. DUESENBERG 1,703,483

BRAKE

Original Filed Nov. 16, 1920    2 Sheets-Sheet 1

Inventor:
Frederick S. Duesenberg,
by Emery, Booth, Janney & Varney
Attys.

Feb. 26, 1929.  1,703,483

F. S. DUESENBERG

BRAKE

Original Filed Nov. 16, 1920    2 Sheets-Sheet 2

Inventor:
Frederick S. Duesenberg
by Emery, Booth, Janney & Varney
Attys

Patented Feb. 26, 1929.

1,703,483

UNITED STATES PATENT OFFICE.

FREDERICK S. DUESENBERG, OF INDIANAPOLIS, INDIANA, ASSIGNOR TO INDIANAPOLIS CORPORATION, OF WILMINGTON, DELAWARE, A CORPORATION OF DELAWARE.

BRAKE.

Original application filed November 16, 1920, Serial No. 424,496. Divided and this application filed November 19, 1923. Serial No. 675,483.

This invention relates to a novel and improved brake, having special utility in connection with motor cars, some features having particular application to front wheel brakes, and others being equally applicable to rear wheel brakes.

The invention will be best understood by reference to the following description, when taken in connection with the accompanying drawings of one illustrative embodiment thereof, while its scope will be more particularly pointed out in the appended claims.

In the drawings:

Fig. 3 is a sectional view on line 3—3 of Fig. 1;

Figure 1:
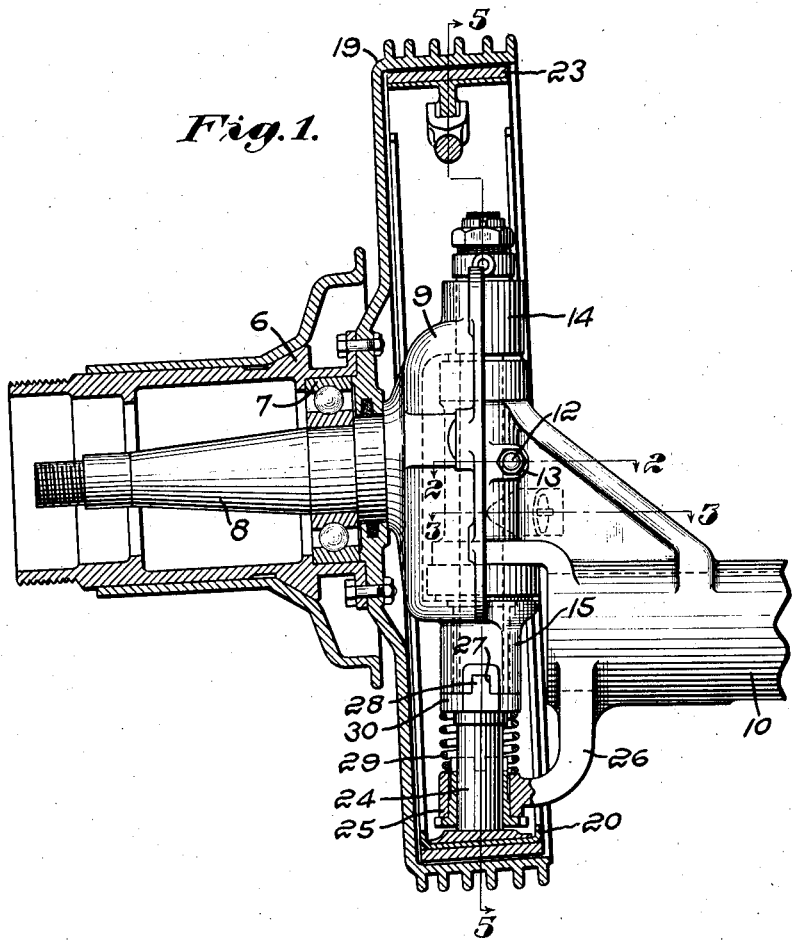
Fig. 1 is a sectional view of a brake exemplifying the invention, as applied to one of the front wheels of a motor vehicle having an axle, and a steering knuckle presenting a spindle about which the wheel turns.

Referring to the drawings, and to the embodiment of the invention which is selected for exemplification, there is shown (see Fig. 1) a portion of a wheel having a hub 6 to turn on bearings, one of which is shown at 7 on a stub axle or spindle 8, herein formed as a part of a steering-knuckle 9, the latter being suitably pivoted on an axle 10, as by the provision of a pivot 11 (see Fig. 5), herein secured to the axle by a tapered pin 12 (see Fig. 2) and nut 13. The steering knuckle herein is provided with upper and lower bearings 14 and 15 (see Fig. 5), and has intermediate these bearings a recess 16, which receives a boss 17 presented by the end of the axle 10. Herein, this boss rests on a ball-thrust bearing 18, which contributes to the ease of steering of the vehicle.

Figure 2:
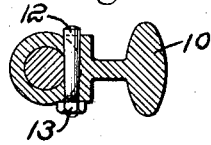
Fig. 2 is a sectional view on line 2—2 of Fig. 1.
Figure 5:
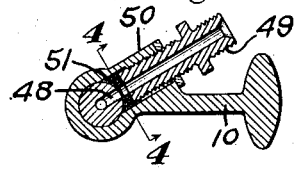
Fig. 5 is a sectional view on line 5—5 of Fig. 1.

Referring now to Fig. 1, suitably secured to the wheel hub is a brake-drum 19, and enclosed by the latter is a brake-shoe or shoes, herein exemplified by a brake-band 20, best shown in Fig. 5, having terminals 21 and 22, which, though forming a part of a single band, are in effect the mechanical equivalents of distinct brake-shoes. The brake-band herein is provided with a usual brake-lining 23.

Since the brake-drum turns with the steering knuckle, the brake-band, in order to remain at all times in cooperative relationship therewith, must also turn in unison with the steering knuckle. Another requirement is that the lower part of the brake-band shall not drag on the internal surface of the brake-drum, when the brakes are released. Turning movement of the brake-band in unison with the steering knuckle is ensured by the provision of a brake-band support 24, which is mounted to turn in a bearing 25 in an ear 26 presented by the axle 10. The lower end of this support is suitably secured to the brake-band, while the upper end is coupled to the steering knuckle, as by a coupling, herein comprising a pair of tongues 27 received in grooves 28 provided in the lower end of the steering knuckle. The support 24 can move up and down within reasonable limits, accompanying expansion or contraction of the brake-band, while still causing the latter to turn with the steering knuckle. A suitable spring 29, herein helically coiled about the intermediate portion of the support 24, bears at one end against an abutment 30 presented by the latter, and at its other end against the ear 26 on the axle, thereby constantly exerting a lifting effect on the lower part of the brake-band, and preventing the latter from dragging when released. This spring also maintains the snug engagement of the coupling parts.

The invention contemplates the use of a suitable fluid, such as oil, for the operation of the brake, under the control of a pump or the like, not shown herein, conveniently located for operation by the driver. To this end, the brake is provided with a fluid motor, herein comprising a cylinder 31 having a piston 32 working therein, one pivotally connected at 33 to one of the brake terminals 21, and the other pivotally connected at 34 to the other brake terminal 22. Thus, it is evident that the brake cylinder and piston are supported jointly by the brake-band terminals, and as they are mounted within the circumferential limits of the brake-drum, they are afforded protection by the latter, and the brakes, moreover, present a more sightly appearance than they would if the cylinder were placed outside. Preferably, the brake cylinders are so arranged that the cylinder heads in which the piston rods are guided are presented in an upward direction, and above the body of oil in the cylinder. In the present example, the cylinder is inclined, as shown in Fig. 5. This arrangement is preferable because, since the level of the oil is below the upper end of the piston rod guide, danger of oil leakage is minimized. The brake is applied by the introduction of oil or other suitable fluid into the brake cylinder, thereby causing the piston and cylinder to be forced in opposite directions. The brake is retracted by a suitable spring 35, herein interposed between the piston and the adjacent end of the cylinder. Preferably, suitable stops are provided to limit the movement of the brake-band terminals toward their released position (in the present example toward each other), and to this end, herein I have provided stops 36 and 37, cooperating with pins 38 and 39 carried by the brake terminals 21 and 22, respectively. Herein, these stops are adjustably mounted, so that as the brake-drum and band wear, adjustment of the stops may be made from time to time, thereby to preserve a certain travel of the brake connections. To this end, the stops in the present example are carried by levers 40 and 41, mounted on pivots 42 and 43 and provided with adjustable set-screws 44 and 45, by means of which the swinging movement of the levers toward each other may be limited.

Figure 4:
Fig. 4 is a sectional view on line 4—4 of Fig. 3.
Figure 5:
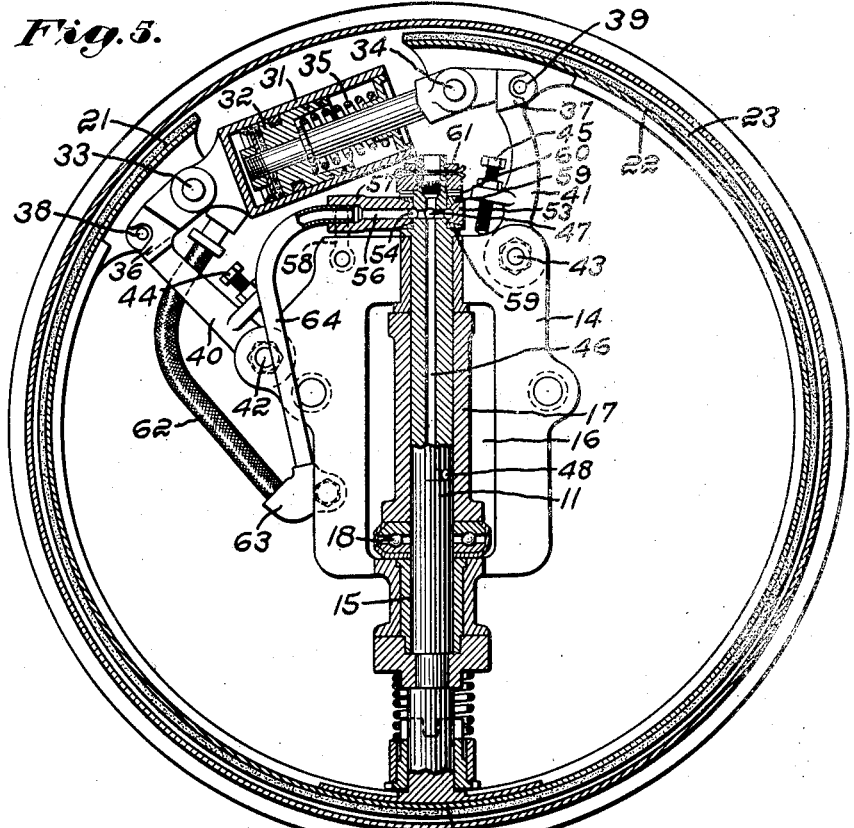

A system of conduits leading to the brake cylinder will now be described, reference being had at first to Fig. 5. The steering pivot 11 in this example is provided with an axial passage 46, as well as upper and lower radial passages 47 and 48. The lower passage is suitably connected with a nipple 49 (see Fig. 3), which is threaded into a boss 50 presented by the axle 10. The bore of the nipple is axially aligned, and communicates with the radial passage 48, and to prevent leakage at the point where they are connected with each other, herein I have provided a packing comprising a soft metal washer 51, which may be made of lead shaped on one side to fit the circumferential surface of the pivot, and on the other side to fit the end of the nipple. This washer may be compressed and squeezed into the cavity and against the abutting surfaces by simply turning the nipple in the proper direction. While the cylindrical shape of the pivot might be relied upon to prevent the washers from rotating as the nipple is turned, I prefer to provide the washer with a projecting key 52 (see Fig. 4), received in a corresponding keyway in the boss 50.

Figure 6:
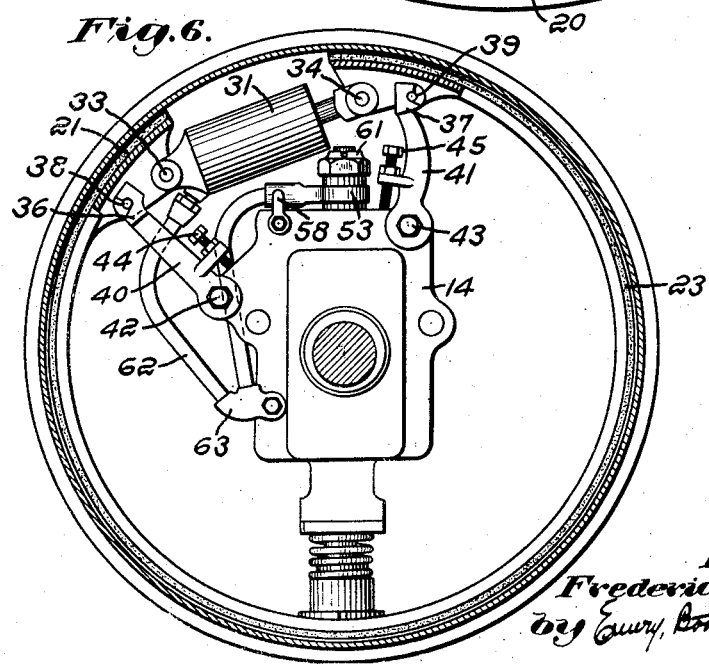
Fig. 6 is an elevation on a reduced scale of the parts shown in Fig. 5.

It will be remembered that the pivot pin 11 is secured against turning movement with respect to the axle, and turns in bearings provided in the steering knuckle. This being so, it is evident that provision should be made for relative turning movement between the hollow pivot and the connections leading therefrom to the brake cylinder. To this end, herein I have provided a swivel 53, shown at the upper portion of Fig. 5, which swivel has a part encircling and mounted to turn about the pivot, and is provided with a circumferential groove 54 communicating with one or more, herein a plurality of the radial passages 47 in the pivot, thereby affording communication at all times between the interior of the pivot and a passage 56 in an arm 57, which is fixedly secured to the steering knuckle, as by a clip 58 (see Fig. 6). A nonleaking joint between the swivel and pivot is ensured by appropriate means, herein principal washers 59 above and below the swivel, a spring washer 60 superimposed upon the upper washer 59, and a nut 61, threaded onto the pivot and serving to maintain the washers under compression.

Suitable connection is made from the swivel to the brake cylinder, and as the latter moves to and fro during the operation of the brake, it is evident that the connection should be flexible, in part at least. To this end, herein I have provided a flexible conduit 62, attached at one end to the brake cylinder, and suitably connected at its other end through the swivel, as by an elbow 63 and a rigid conduit 64. The location of the elbow is such that but slight bending movement is required of the flexible conduit,—hence there is little likelihood of its becoming injured, owing to the bending action.

The general operation of the brake should be evident from the foregoing, without further description, except to say that the brake is applied by the use of a master cylinder, not shown herein, which forces fluid through the described connections to the brake cylinder. When the pressure is removed, the parts are restored to their initial positions by the action of the spring 35 on the piston 32.

This application is a division of my pending application, Ser. No. 424,496, filed November 16, 1920, which has eventuated in the issuance of Letters Patent No. 1,490,163.

Having thus described one embodiment of the invention, but without limiting myself thereto, what I claim and desire by Letters Patent to secure is:

1. In a brake mechanism, the combination of a brake-drum, brake-shoe means having two parts which move toward and from each other in applying and releasing the brake, a brake cylinder pivotally connected to one of said parts, and stops to limit movement of said parts toward their released position, said stops having provision for adjustment in the direction of such movement.

2. In a brake mechanism, the combination of a brake-drum, brake-shoe means having two parts which move toward and from each other in applying and releasing the brake, stops to limit the movement of said parts toward their released position, and adjustable levers by which said stops are carried and mounted for adjustment in the direction of such movement.

3. In a vehicle, the combination of a steering knuckle, a brake-drum carried thereby, a brake-shoe within said drum, and means to support said brake-shoe and to cause the same to turn with said steering knuckle, said means including a spring urging said brake-shoe away from said brake-drum in a direction lengthwise of the axis of said steering knuckle.

4. In a vehicle, the combination of a steering knuckle, a brake-drum carried thereby, a brake-shoe within said drum, and means to support said brake-shoe and to cause the same to turn with said steering knuckle, said means including a coupling connecting said steering knuckle and brake-shoe to cause them to turn in unison, and a spring on the one hand urging said coupling together and on the other hand urging said brake-shoe away from said brake-drum.

5. In a vehicle, the combination of a steering knuckle, a brake drum carried thereby, brake shoe means presenting two parts within said drum, means to move said parts toward and from each other in a direction generally tangential to said drum, and supporting means disposed endwise of said steering knuckle to support said brake shoe means and to cause the same to turn with said steering knuckle, said supporting means including an axially separable coupling connecting said steering knuckle and said brake shoe means to cause them to turn in unison.

6. In a fluid-operated brake system for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, brake-shoe actuating means including a cylinder and piston carried by said steering knuckle, conduit means carried by said steering knuckle and communicating on the one hand with said cylinder and on the other hand with the interior of said hollow pivot, and a conduit carried by said axle and communicating with said hollow pivot.

7. In a fluid-operated brake system for steerable vehicles, the combination of an axle, a steering knuckle, a hollow pivot secured to said axle and presenting a pivotal support about which said steering knuckle turns, a brake-drum and brake-shoe carried by said steering knuckle and turning therewith, and brake-shoe actuating means including a cylinder and piston carried by said steering knuckle, conduit means carried by said steering knuckle and communicating on the one hand with said cylinder and on the other hand with said hollow pivot, said conduit means including a swivel mounted to turn about said hollow pivot, and other conduit means carried by said axle and communicating with said hollow pivot.

8. In a fluid-operated brake system for steerable vehicles, the combination of an axle, a steering knuckle, a pivot connecting said steering knuckle to said axle to allow the former to turn relatively to the latter, said pivot being provided with longitudinal and transverse passages, a brake and brake-shoe carried by said steering knuckle and turning therewith, and brake-shoe actuating means including a cylinder and piston carried by said steering knuckle, conduit means carried by said steering knuckle and communicating on the one hand with said cylinder and on the other hand with one of said transverse passages, and other conduit means carried by said axle and communicating with another of said transverse passages.

9. In a fluid-operated brake system for steerable vehicles, the combination of an axle, a steering knuckle, a pivot connecting said steering knuckle to said axle to allow the former to turn relatively to the latter, said pivot being provided with longitudinal and transverse passages, a brake and brake-shoe carried by said steering knuckle and turning therewith, and brake-shoe actuating means including a cylinder and piston carired by said steering knuckle, conduit means carried by said steering knuckle and communicating on the one hand with said cylinder and on the other hand with one of said transverse passages, and other conduit means carried by said axle and communicating with another of said transverse passages, said other conduit means including a hollow plug, and a compressible washer interposed between and held under compression by said plug and said pivot about the last-mentioned transverse passage.

10. In a fluid-operated brake system for steerable vehicles, the combination of an axle, a steering knuckle, a pivot connecting said steering knuckle to said axle to allow the former to turn relatively to the latter, said pivot being provided with longitudinal and transverse passages, a brake and brake-shoe carried by said steering knuckle and turning therewith, and brake-shoe actuating means including a cylinder and piston carried by said steering knuckle, conduit means carried by said steering knuckle and communicating on the one hand with said cylinder and on the other hand with one of said transverse passages, and other conduit means carried by said axle and communicating with another of said transverse passages, said other conduit means including a hollow, threaded plug, and a compressible washer interposed between and held under compression by said plug and pivot about the last-mentioned passage and having means holding the same against rotation during rotation of said plug.

11. In a brake mechanism, the combination of a hollow brake-drum, brake-shoe means within said drum presenting a pair of relatively movable terminals, brake-shoe actuating means including a cylinder and a piston within said brake-drum, an axle which carries said brake-drum, and means supported by said axle to limit movement of said brake-shoe means toward their released position.

12. In a brake mechanism, the combination of a hollow brake-drum, brake-shoe means within said drum presenting a pair of relatively movable terminals, brake-shoe actuating means including a cylinder and a piston within said brake-drum, an axle which carries said brake-drum, and stops supported by said axle to limit movement of said brake-shoe means toward their released position, said stops being mounted for adjustment in the direction of such movement.

13. In a fluid-operated brake system for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, brake-shoe actuating means including a piston and cylinder carried by said steering knuckle, and a conduit connecting on the one hand with said cylinder and on the other hand with said hollow pivot.

14. In a fluid-operated brake system for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, brake-shoe actuating means including a piston and cylinder carried by said steering knuckle, and a conduit connecting on the one hand with said cylinder and on the other hand with said hollow pivot, said conduit having swivel connection with said hollow pivot.

15. In a fluid-operated brake system for steerable vehicles, the combination of an axle, a pivoted steering knuckle, a conduit coaxial with the pivotal axis of said steering knuckle, a brake-drum and brake-shoe carried by said steering knuckle and turning therewith, and brake-actuating means including a piston and cylinder carried by and turning with said steering knuckle, said cylinder communicating with said conduit.

16. In a fluid operated brake for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, and brake-shoe actuating means including a piston and cylinder, said cylinder being above said hollow pivot and communicating therewith.

17. In a fluid operated brake for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, and brake-shoe actuating means including a piston and cylinder outside said steering knuckle, said cylinder communicating with said hollow pivot.

18. In a fluid operated brake for steerable vehicles, the combination of an axle, a steering knuckle, a hollow pivot connecting said steering knuckle to said axle to allow the former to turn with relation to the latter, a brake-drum and brake-shoe carried by said steering knuckle and turning therewith, brake-shoe actuating means including a piston and cylinder outside said steering knuckle, and means including a hollow swivel affording communication between said cylinder and said hollow pivot.

19. In a vehicle, the combination of a steering knuckle, a hollow brake drum carried thereby, brake-shoe means within said drum presenting a pair of terminals which move toward and from each other, actuating means including a cylinder and piston within said brake-drum and connected to said terminals to actuate them, and means supported by said steering knuckle to limit movement of said terminals toward each other.

20. In a vehicle, the combination of a steering knuckle a hollow brake-drum carried thereby, brake-shoe means within said drum presenting a pair of terminals which move toward and from each other, actuating means including a cylinder and piston within said brake-drum and connected to said terminals to actuate them, and stops supported by said steering knuckle to limit movement of said terminals toward each other, said stops having provision for adjustment toward and from each other.

21. In a fluid-operated brake system for steerable vehicles, the combination of an axle, a steering pivot, a steering knuckle which turns about the axis of said steering pivot, a brake-drum and brake-shoe carried by said steering knuckle and turning therewith about said axis, and brake-actuating means including a piston and cylinder carried by and turning with said steering knuckle, and a fluid conduit communicating with said cylinder, said conduit including a part coaxial with and supported by said steering pivot.

22. In a fluid-operated brake system for steerable vehicles, the combination of an axle, a pivoted steering knuckle, a brake-drum and brake-shoe carried by said steering knuckle and turning therewith, and brake-actuating means including a piston and cylinder carried by and turning with said steering knuckle, and a fluid conduit including a part supported by said axle, a part coaxial with the pivotal axis of said steering knuckle, and a part carried by said steering knuckle In testimony whereof, I have signed my name to this specification.

FREDERICK S. DUESENBERG.